(12) United States Patent
Yousef (10) Patent No.: US 8,000,395 B2
(45) Date of Patent: Aug. 16, 2011

(54) SYSTEM AND METHOD FOR STATISTICAL MULTIPLEXING OF VIDEO CHANNELS FOR DVB-H MOBILE TV APPLICATIONS

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 1484 days.

(21) Appl. No.: 11/440,298

(22) Filed: May 24, 2006

(65) Prior Publication Data

US 2007/0277210 A1    Nov. 29, 2007

(51) Int. Cl.
*H04N 7/18* (2006.01)
(52) U.S. Cl. .............................. 375/240.26; 375/240.01
(58) Field of Classification Search . 375/240.01–240.29
See application file for complete search history.

(56) References Cited

U.S. PATENT DOCUMENTS

| | | | |
|---|---|---|---|
| 5,686,963 A | 11/1997 | Uz et al. | |
| 7,613,112 B2 * | 11/2009 | Jyske et al. | 370/230 |
| 7,738,409 B2 * | 6/2010 | Karkas et al. | 370/310 |
| 2002/0094031 A1 | 7/2002 | Ngai et al. | |
| 2002/0184642 A1 | 12/2002 | Lude et al. | |
| 2005/0097595 A1 | 5/2005 | Lipsanen et al. | |
| 2005/0286857 A1 | 12/2005 | Kallio | |
| 2006/0084435 A1 | 4/2006 | Borsos et al. | |

* cited by examiner

*Primary Examiner* — Andy Rao
(74) *Attorney, Agent, or Firm* — Rahman LLC (57) ABSTRACT

A DVB-H transmitter having a plurality of video encoders each having a variable bit rate associated with IP datagrams for each television program broadcast by one RF channel. A method is also provided for statistical multiplexing of video channels for DVB-H mobile TV applications, wherein the method includes jointly configuring a plurality of video encoders each having a variable bit rate associated with IP datagrams for each television program broadcast by one RF channel.

22 Claims, 10 Drawing Sheets

SYSTEM AND METHOD FOR STATISTICAL MULTIPLEXING OF VIDEO CHANNELS FOR DVB-H MOBILE TV APPLICATIONS

BACKGROUND AND SUMMARY

The embodiments herein generally relate to mobile television (TV) technologies, and, more particularly, to transmission schemes for mobile TV digital video broadcasting (DVB) applications.

Handheld devices with integrated digital television access are a relatively new phenomenon. Such technology has traditionally been limited by size, power consumption, and most importantly performance. Poor performance of such devices has typically been the result of the constantly changing receiver environment. More particularly, the quality of the received signal is affected by the device's ability to manage adjacent-channel rejection, low signal-to-noise ratios, and Doppler compensation, among other factors.

Digital Video Broadcasting-Handheld (DVB-H) is the specification for bringing broadcast services to handheld receivers, and was formally adopted as an ETSI (European Telecommunications Standards Institute) standard in November 2004. More specifically, DVB-H is a terrestrial digital TV standard that tends to consume less power than its predecessor, the DVB-T standard, and generally allows the receiver to move freely while receiving the signal transmission, thereby making it ideal for cellular phones and other mobile devices to receive digital TV broadcasting over the digiTV network, and hence without having to use cellular telephone networks.

In mobile TV DVB-H systems such as DVB-H (ETSI EN 301 192), one radio frequency (RF) channel is shared among many TV channels (TV programs). These TV channels are multiplexed in the time domain. Each channel is given full access to the entire RF channel bandwidth for a short period of time (burst duration). After that data burst is transmitted, bursts for other channels occupy the RF channel and so on. This multiplexing process is called time division multiplexing (TDM).

Figure 1:
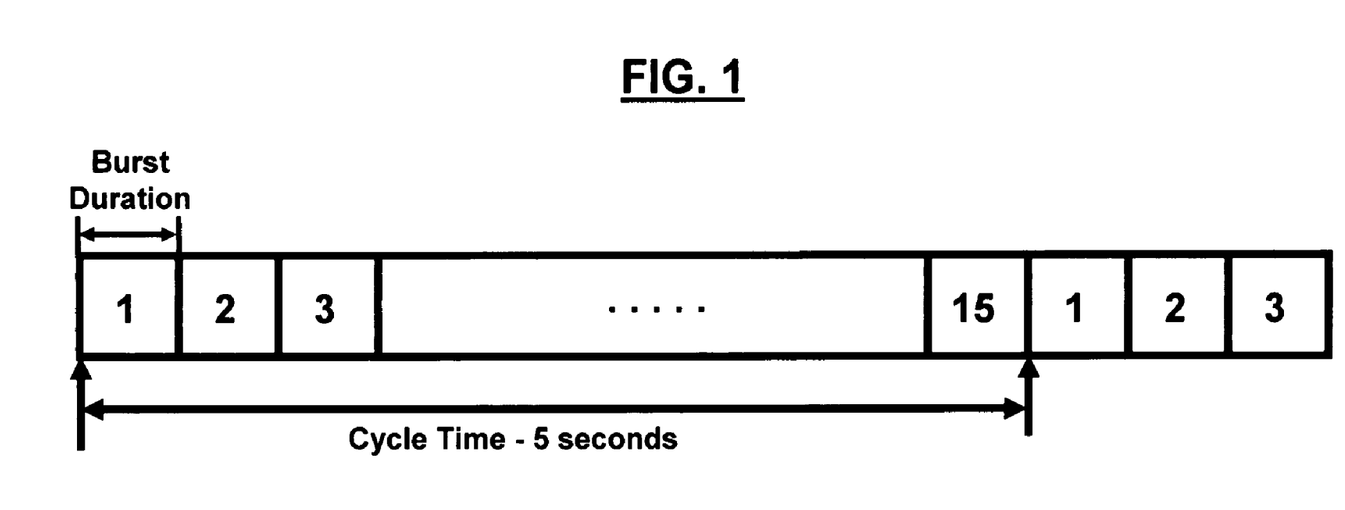
FIG. 1 is a schematic diagram illustrating time division multiplexing of video channels used in accordance with the embodiments herein.

FIG. 1 shows an example of time division multiplexing of 15 TV channels on one RF channel. In FIG. 1, the TV channels are labeled 1, 2, 3, . . . , 15. As shown in FIG. 1, each TV channel occupies the entire RF channel for $$\frac{1}{15}$$

of the time. A receiver which is watching only one channel (for example, channel 2) only has to be active (ON) during the periods of channel 2 bursts. In order to conserve battery consumption, such a receiver will typically turn off its circuits when channel 2 bursts are not occupying the RF channel. Thus, the receiver enters into a SLEEP mode. This suggests that the TDM of channels can help reduce power consumption of a receiver watching a single channel. For the channel line up depicted in FIG. 1, each burst contains five seconds (cycle time) of encoded video.

Figure 2:
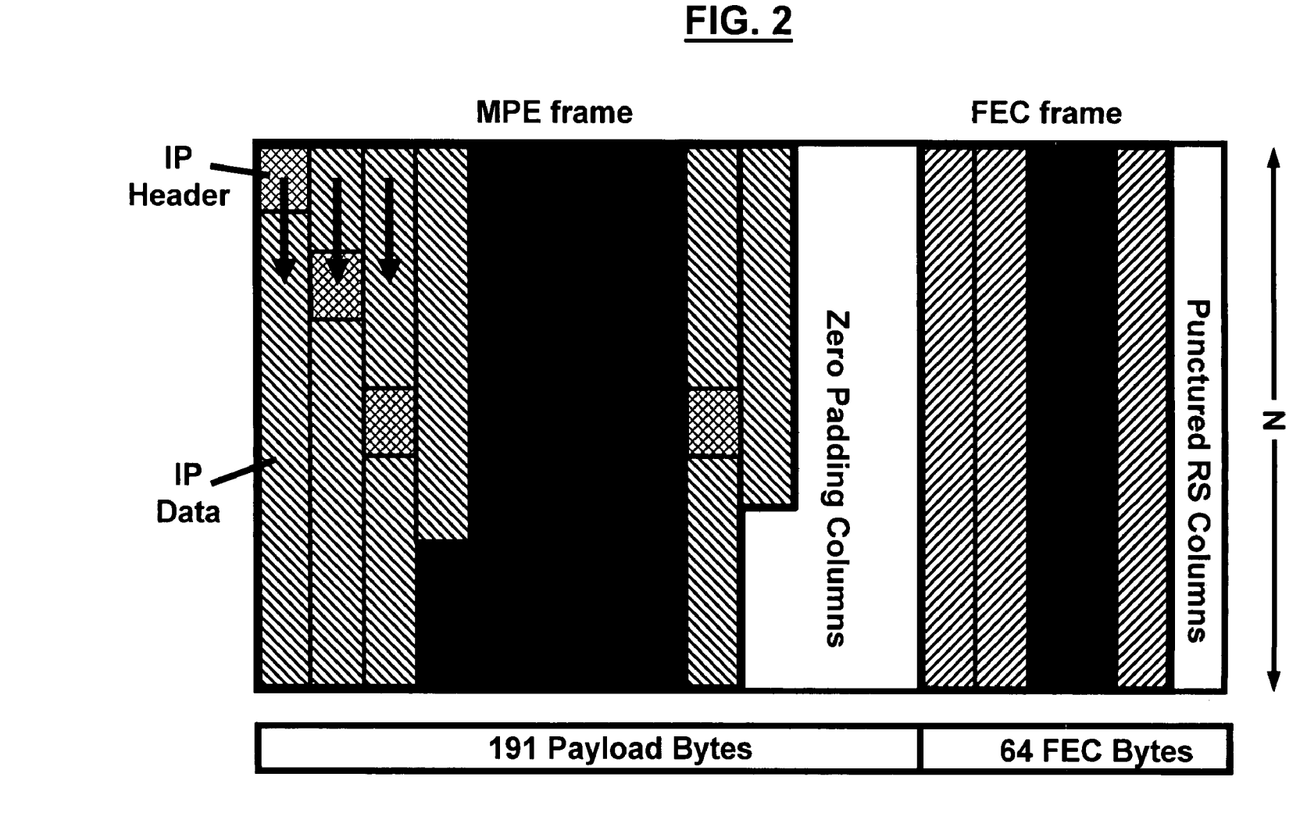
FIG. 2 is a schematic diagram illustrating MPE-FEC RS coding used in accordance with the embodiments herein.

In DVB-H systems, the burst size allocated to each channel is fixed (for example, 2 Mbit). It is also common to use forward error correction (FEC) to protect the transmitted burst against fading of the wireless channel. FIG. 2 shows a FEC scheme in DVB-H. Encoded video is transmitted in the form of Internet Protocol (IP) datagrams. The IP datagrams fill what is known as a multi protocol encapsulation (MPE) frame that consists of 191 columns. The data is encoded row wise using a Reed Solomon (RS) code to obtain 64 FEC columns that form a FEC frame. Thus, the MPE frame is approximately 1.5 Mbit and the FEC frame is approximately 0.5 Mbit. Both the MPE and FEC frames form a 2 Mbit MPE-FEC frame. The DVB-H standard allows zero padding of the data, when the data size is less than 1.5 Mbit. In other words, when the data size is less than 1.5 Mbit (for example, the data size is 1.4 Mbit), then ZERO data is added to the real data to actual data such that the total size becomes 1.5 Mbit. In this example 0.1 Mbit of zeros are added; hence the term "zero padding" is used in the context herein. The zero padding bits are not transmitted. Furthermore, the DVB-H specification allows the transmitter to choose to transmit only a subset of the FEC columns. The FEC columns that are not transmitted are called punctured columns. The receiver treats the punctured columns as errors and declares them as erasures in the RS decoding process. Thus, only the hatched portions in FIG. 2 are transmitted to the receiver. For the example given in FIG. 1, the average bit rate of the transmitted video channel is approximately 1.5 Mbit/5 seconds—100 Kpbs. This rate is fixed for all the channels in this example.

Figure 3:
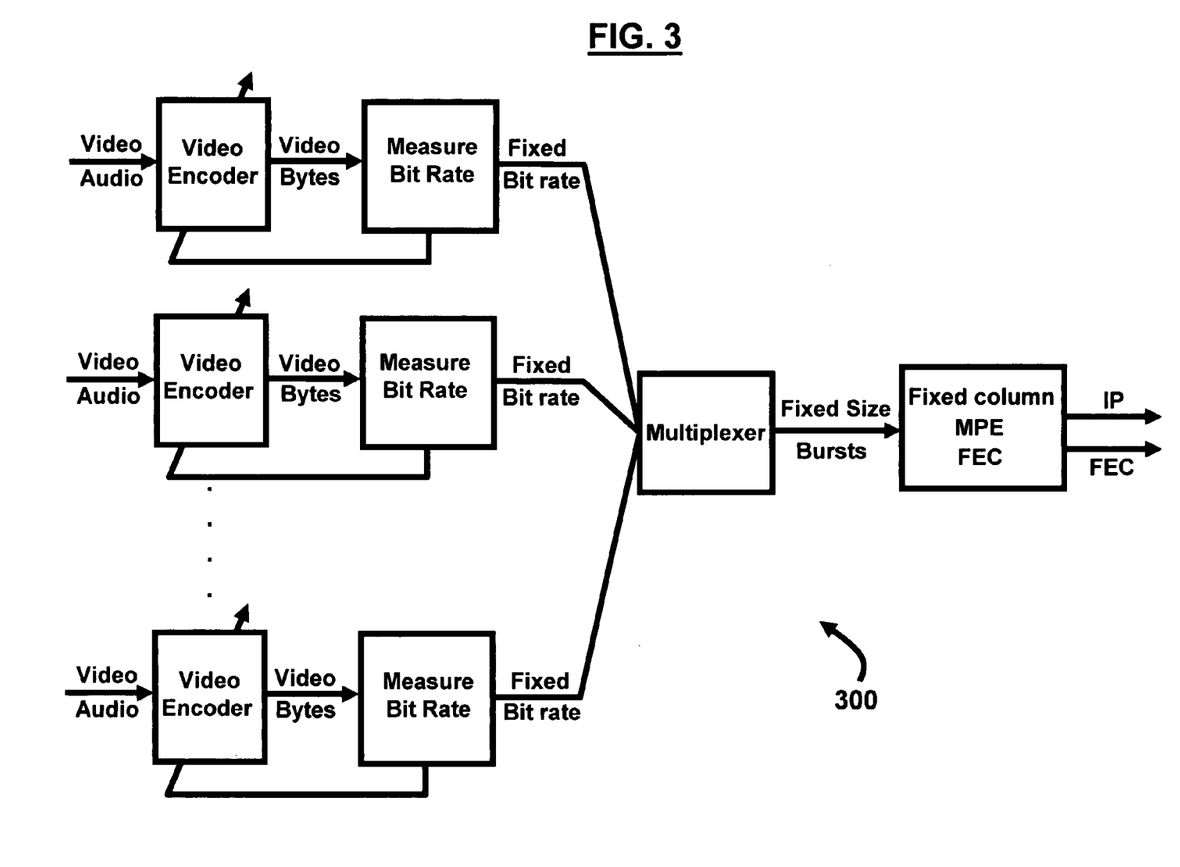
FIG. 3 is a schematic diagram illustrating a conventional DVB-H transmitter architecture using fixed burst size for all video channels.

The bit rate generated from a video encoder depends on the nature of the video program that is being transmitted on a particular channel. For example, a sports event that generally contains fast motion and a frequently changing picture background typically needs more bits to represent the video than a news channel that has a generally static background, for example. To achieve the same quality of video, the sports channel is assigned a higher bit rate than the news channel. Now, if each channel is assigned the same fixed burst size, then the average bit rate of each channel will be fixed. In order to achieve a given quality standard of video for all programs, the system has to accommodate the worst case channel. In other words, the burst size will be chosen to be adequate for the highest needed bit rate to accommodate the most demanding channel (i.e., demanding in terms of a high data rate). Thus, for the channels that do not need such a high bit rate of the worst case channel, bits have to be wasted by sending null packets or dummy data. FIG. 3 illustrates a transmitter architecture 300 which uses a fixed burst size for all video channels. Accordingly, there remains a need for a new technique that is capable of providing a variable burst size for different video channels.

In view of the foregoing, an embodiment of the invention provides a DVB-H transmitter comprising a plurality of video encoders each having a variable bit rate associated with IP datagrams for each television program broadcast by one RF channel. Preferably, each video encoder is adapted to create the variable bit rate by controlling quantization parameters associated with the particular TV channel to achieve a given picture quality. The transmitter may further comprise a control mechanism operatively connected to the plurality of video encoders, wherein the control mechanism is adapted to measure a fixed total bit rate generated from all of the plurality of video encoders and to fix a uniform video quality standard among all TV channels. Moreover, the transmitter may further comprise a DVB-H encapsulator operatively connected to each video encoder, wherein the DVB-H encapsulator is adapted to apply a MPE section and a FEC section to transmitted IP datagrams.

Preferably, the DVB-H encapsulator is adapted to generate a variable data burst size for each TV channel by adapting the number of MPE columns on a MPE frame and adapting the number of FEC columns for each data burst to retain a constant MPE-FEC rate corresponding to the transmitted IP datagrams. Furthermore, each video encoder is preferably adapted to create the variable bit rate by controlling quantization parameters associated with the particular TV channel to achieve a given picture quality. Additionally, the DVB-H encapsulator is preferably adapted to provide a Delta-t parameter for each data burst independently to convey timing information to a receiver.

Another embodiment provides a a DVB-H transmitter comprising a plurality of video encoders operatively connected to one another, wherein each video encoder corresponds with a separate TV channel, and wherein each video encoder is adapted to receive audio and video (AV) IP datagrams and to generate a variable encoder bit rate corresponding to an AV transmission signal for a particular TV channel; a control mechanism operatively connected to the plurality of video encoders, wherein the control mechanism is adapted to measure a fixed total encoder bit rate generated from all of the plurality of video encoders and to fix a uniform video quality standard among all TV channels; a DVB-H encapsulator operatively connected to the plurality of video encoders, wherein the DVB-H encapsulator is adapted to apply a MPE section and a FEC section to transmitted IP datagrams, and wherein the DVB-H encapsulator is adapted to generate a variable data burst size for each TV channel by adapting the number of MPE columns on a MPE frame and adapting the number of FEC columns for each data burst to retain a constant MPE-FEC rate corresponding to the transmitted IP datagrams; and a multiplexer operatively connected to the DVB-H encapsulator, wherein the multiplexer is adapted to receive the transmitted IP datagrams and generate DVB-H transport stream (TS) data packets.

Preferably, each video encoder is adapted to create a variable encoder bit rate by controlling quantization parameters associated with the particular TV channel to achieve a given picture quality. Moreover, the DVB-H encapsulator is preferably adapted to provide a Delta-t parameter for each data burst independently to convey timing information to a receiver.

Another embodiment provides a method for statistical multiplexing of video channels for DVB-H mobile TV applications, and a program storage device readable by computer, tangibly embodying a program of instructions executable by the computer to perform the method, wherein the method comprises jointly configuring a plurality of video encoders each having a variable bit rate associated with IP datagrams for each television program broadcast by one RF channel. The method may further comprise creating the variable bit rate by controlling quantization parameters associated with the particular TV channel to achieve a given picture quality.

Additionally, the method may further comprise operatively connecting a control mechanism to the plurality of video encoders; generating a fixed total bit rate generated from all of the plurality of video encoders; and generating a fixed uniform video quality standard among all TV channels. Also, the method may further comprise operatively connecting a DVB-H encapsulator to each video encoder; applying a MPE section and a FEC section to transmitted IP datagrams; and generating a variable data burst size for each TV channel by adapting the number of MPE columns on a MPE frame; and adapting the number of FEC columns for each data burst to retain a constant MPE-FEC rate corresponding to the transmitted IP datagrams. Furthermore, the method may further comprise creating the variable bit rate by controlling quantization parameters associated with the particular TV channel to achieve a given picture quality. Moreover, the method may further comprise adapting a Delta-t parameter for each data burst independently to convey timing information to a receiver.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new technique that is capable of providing a variable burst size for different video channels. The embodiments herein achieve this by providing a technique for statistical multiplexing of video channels for DVB-H mobile TV applications. The biggest obstacle overcome by the embodiments herein is using a variable bit rate in a DVB-H system because the DVB-H standard is not designed to accommodate variable rates. For the variable rate system provided by the embodiments herein, the size of the data is adapted as well as the size of the FEC. Referring now to the drawings, and more particularly to FIGS. 1 through 8(C), where similar reference characters denote corresponding features consistently throughout the figures, there are shown preferred embodiments.

For a given TV program, the needed encoder bit rate required to achieve a certain quality of picture varies with time according to the variable nature of the video on the particular channel. For example, if a movie is being transmitted on a certain channel, some parts of this movie could contain fast motion scenes while others may be static in nature. Thus, the bit rate of a given channel to achieve a constant quality of picture should vary with time. Again, if a constant bit rate is given to all channels, then the worst case has to be accommodated, thereby wasting channel capacity, which tends to lead to transmitting fewer number of TV programs (or services) on a given RF channel.

According to the embodiments herein, in order to avoid wasting channel capacity, the video programs are jointly multiplexed to achieve constant quality. Statistical multiplexing of video channels in accordance with the embodiments herein could save up to 20-30% of channel capacity. In other words, it can increase the number of video programs on a given RF channel by approximately 20-30%. The embodiments herein provide an adaptive transmission scheme that enables statistical multiplexing of video channels on DVB-H systems without adding any overhead or sacrificing performance. Furthermore, the transmission scheme is fully compatible with the DVB-H standard.

Figure 4:
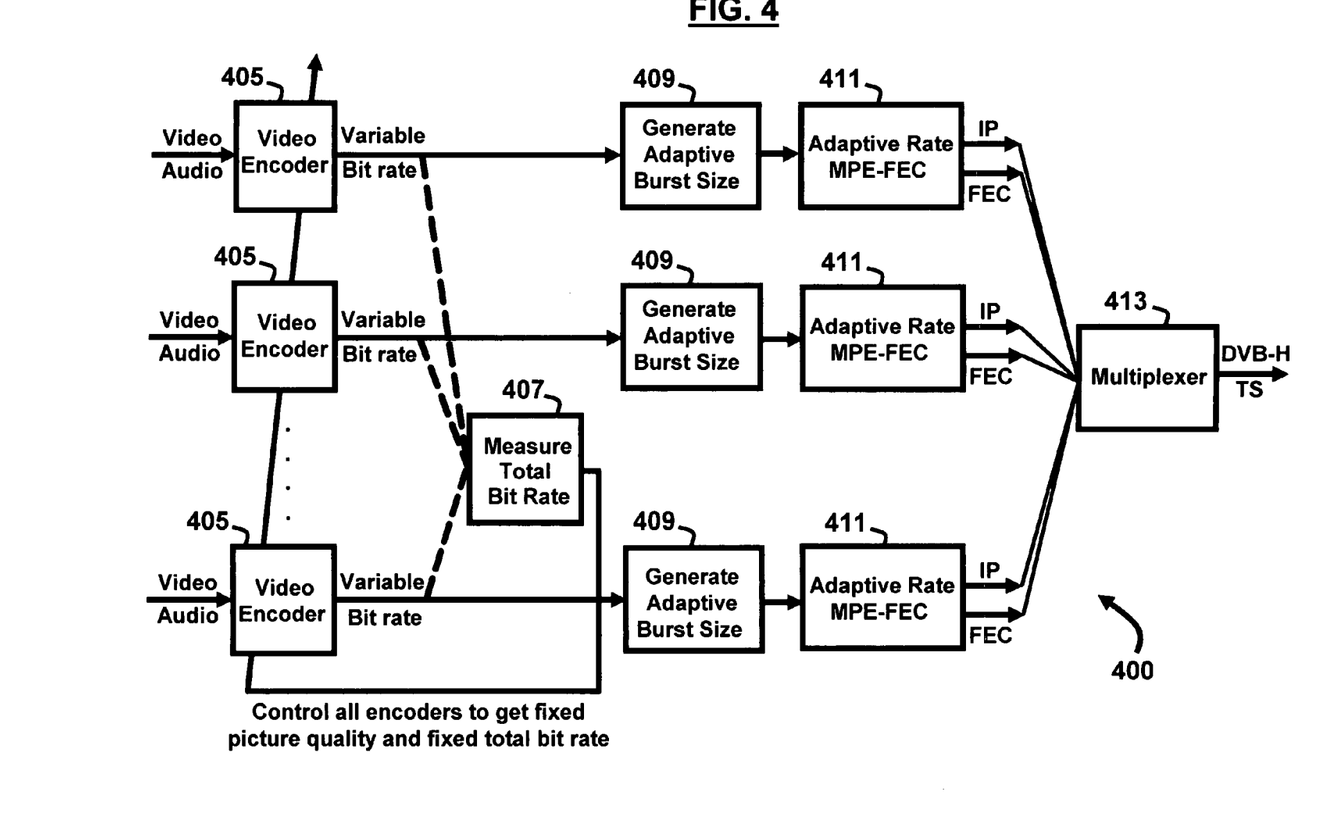
FIG. 4 is a schematic diagram illustrating a DVB-H transmitter architecture using an adaptive burst size for different video channels according to an embodiment herein.

FIG. 4 shows a general block diagram of the transmission scheme/architecture 400 provided by the embodiments herein. According to the embodiments herein, a fixed bit rate is not used for all channels. Rather, a variable bit rate encoder 405 is used for each video channel. Each encoder 405 reports a picture quality measure (for example, the signal to noise ratio (SNR)) of the picture. The quality measure should preferably be fixed to the same value for all channels. This occurs, for example, if the quality of a given channel is low, then the bit rate allocated to the channel is increased until the SNR goes to the desired value and vice versa. This guarantees the same picture quality for all channels irrespective of its content (i.e., content of the video programming occurring on the channel). However, a different (variable) bit rate is generated for different channels.

The total bit rate is measured by a control mechanism 407 and is used to control all encoders 405 jointly to adjust the total bit rate to the available channel bit rate. Preferably, the total bit rate is an average among all of the variable bit rates. Fixing the total bit rate and the picture quality allows statistical multiplexing (or adaptive allocation of channel capacity) among different channels and over time. This allows the use of more video channels when compared to fixed bit rate for all channels.

The variable bit rate of each channel is used to generate data bursts that vary in size from one channel to another 409. The burst size could be adapted in a fashion that complies with the DVB-H specification by adapting the number of zero padding columns in the MPE frame (of FIG. 2). For a long burst a small number of zero padding columns are used and vice versa. Furthermore, in order to keep the same protection for all bursts, the number of FEC columns is also adapted to keep the FEC rate (ratio between the number of MPE columns to the total number of MPE plus FEC columns) constant among all channels 411. This occurs given the number of data columns used for a given burst and using a fixed FEC rate (for example, $$\frac{3}{4}$$

), the number of added FEC columns should be $$\frac{1}{4}$$

the number of data columns. Thus, the number of FEC columns varies with the number of data columns.

Figure 5:
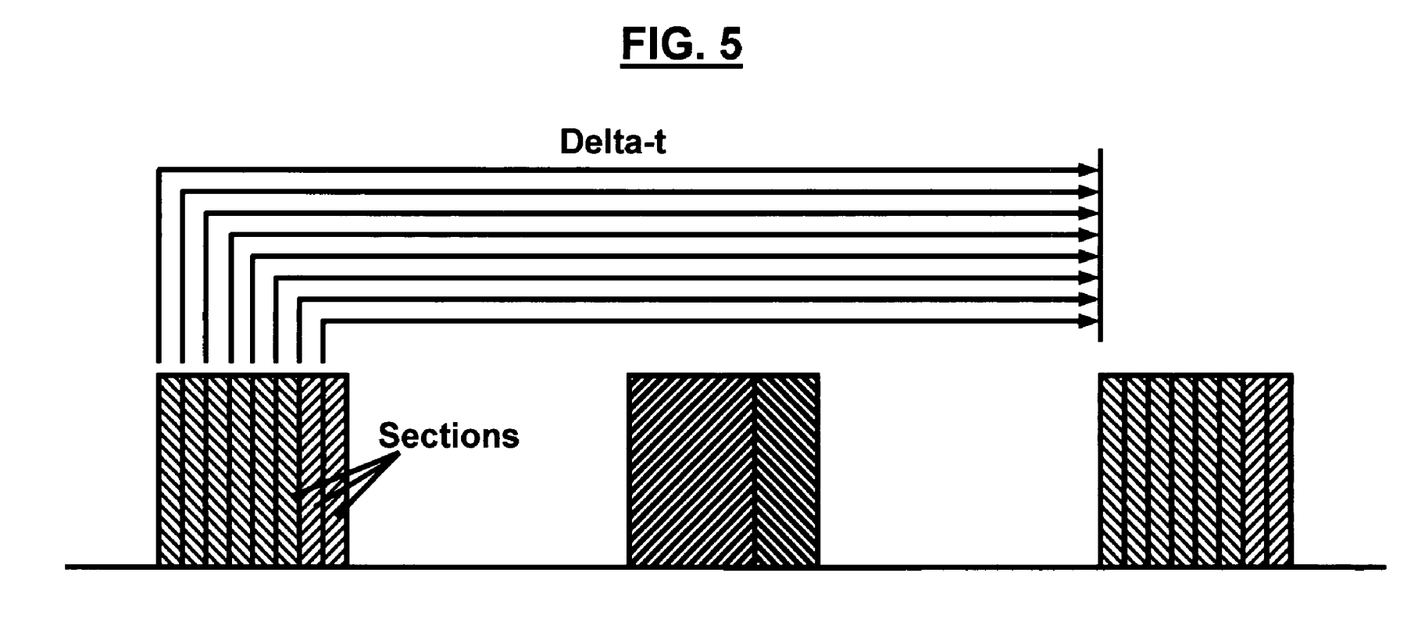
FIG. 5 is a schematic diagram illustrating delta-t signaling according to an embodiment herein.

Because different channels have different burst sizes that change with time, the time period between bursts (cycle time) will change with time. Preferably, this is signaled to a receiver 425 (of FIG. 6) in order to save power consumption. In order to do this, the value of Delta-t, shown in FIG. 5, should preferably be adapted independently for each channel and over time from burst to burst. In this regard, Delta-t is a real time parameter that is signaled by a transmitter 400 to a receiver 425 to inform the receiver 425 of the time of arrival of the next burst. Therefore, the receiver 425 can save power by shutting OFF its circuits during the time in between bursts. When burst sizes vary from one burst to the other, the duration between bursts will also vary, thus Delta-t has to be adapted over time and cannot be kept constant. In FIG. 5, "Sections" refers to MPE Sections (IP datagrams) or FEC sections.

The embodiments herein utilize a fixed variable rate video encoder 405 for each channel. The encoder bit rate could be adapted by controlling the quantization parameters to achieve a given picture quality. The video bit rate and thus encoded video quality is affected by the number of bits that are used to quantize picture elements. Thus, the quantization parameters control the bit rate and the video quality. The video encoders 405 have the quantization parameters as controllable parameters. Moreover, the encoders 405 are jointly adapted to generate a fixed total bit rate and a fixed video quality standard among channels. Furthermore, a variable burst size is generated 409 for each video channel by adapting the number of MPE columns. Additionally, the number of FEC columns for each burst is adapted to keep a constant MPE-FEC rate 411. Also, the Delta-t parameter for each burst is independently adapted to convey timing information to the receiver 425 (of FIG. 6) via the multiplexer 413.

Figure 6:
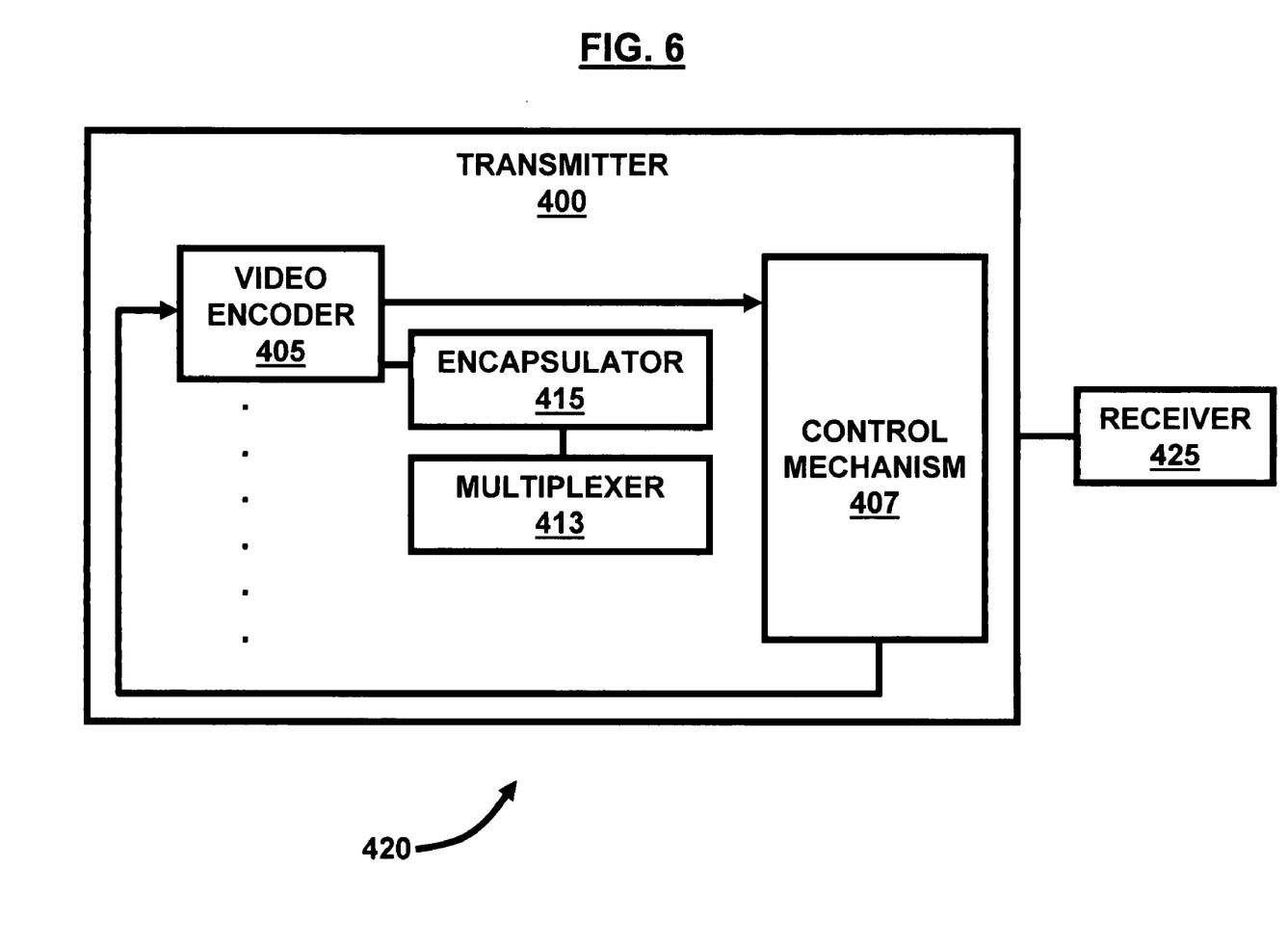
FIG. 6 is a schematic diagram illustrating a system according to an embodiment herein.

FIG. 6, with reference to FIGS. 1 through 5, illustrates a system 420 according to an embodiment herein, wherein the system 420 comprises a DVB-H transmitter 400 comprising a plurality of video encoders 405 operatively connected to one another, wherein each video encoder 405 corresponds with a separate TV channel, and wherein each video encoder 405 is adapted to receive AV IP datagrams and to generate a variable encoder bit rate corresponding to an AV transmission signal for a particular TV channel.

The DVB-H transmitter 400 further comprises a control mechanism 407 operatively connected to the plurality of video encoders 405, wherein the control mechanism 407 is adapted to measure a fixed total encoder bit rate generated from all of the plurality of video encoders 405 and to fix a uniform video quality standard among all TV channels. The DVB-H transmitter 400 also includes a DVB-H encapsulator 415 operatively connected to the plurality of video encoders 405, wherein the DVB-H encapsulator 415 is adapted to apply a MPE section and a FEC section to transmitted IP datagrams, and wherein the DVB-H encapsulator 415 is adapted to generate a variable data burst size for each TV channel by adapting the number of MPE columns on a MPE frame and adapting the number of FEC columns for each data burst to retain a constant MPE-FEC rate corresponding to the transmitted IP datagrams.

Furthermore, the DVB-H transmitter 400 further comprises a multiplexer 413 operatively connected to the DVB-H encapsulator 415, wherein the multiplexer 413 is adapted to receive the transmitted IP datagrams and generate DVB-H TS data packets. Preferably, each video encoder 405 is adapted to create a variable encoder bit rate by controlling quantization parameters associated with the particular TV channel to achieve a given picture quality. Moreover, the DVB-H encapsulator 415 is preferably adapted to provide a Delta-t parameter for each data burst independently to convey timing information to a receiver 425.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form including both hardware and software elements. The software embodiments include, but is not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
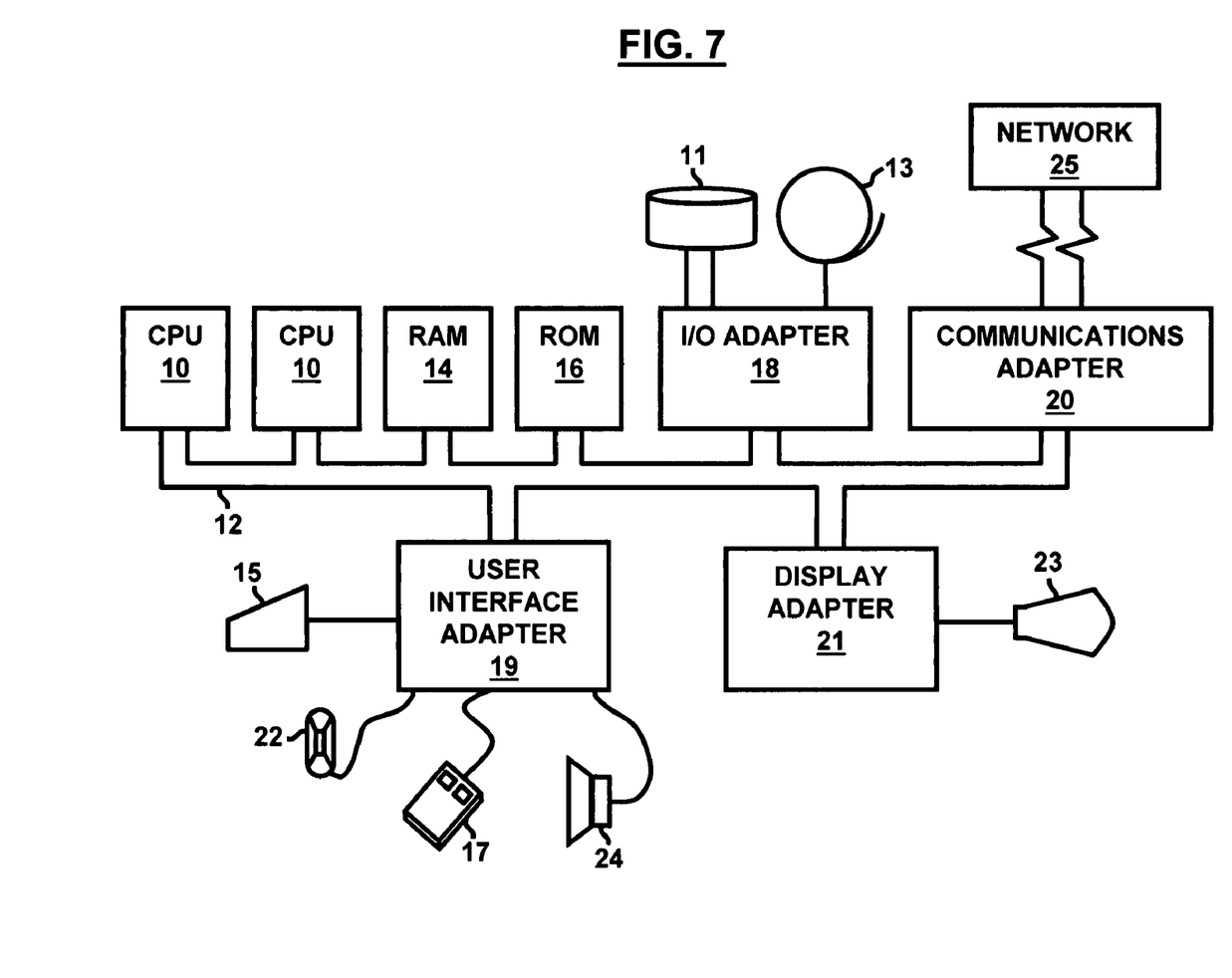
FIG. 7 is a schematic diagram illustrating a computer system according to an embodiment herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a RAM 14, ROM 16, and an I/O adapter 18. The I/O adapter 18 can connect to peripheral devices, such as disk units 111 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 8A:
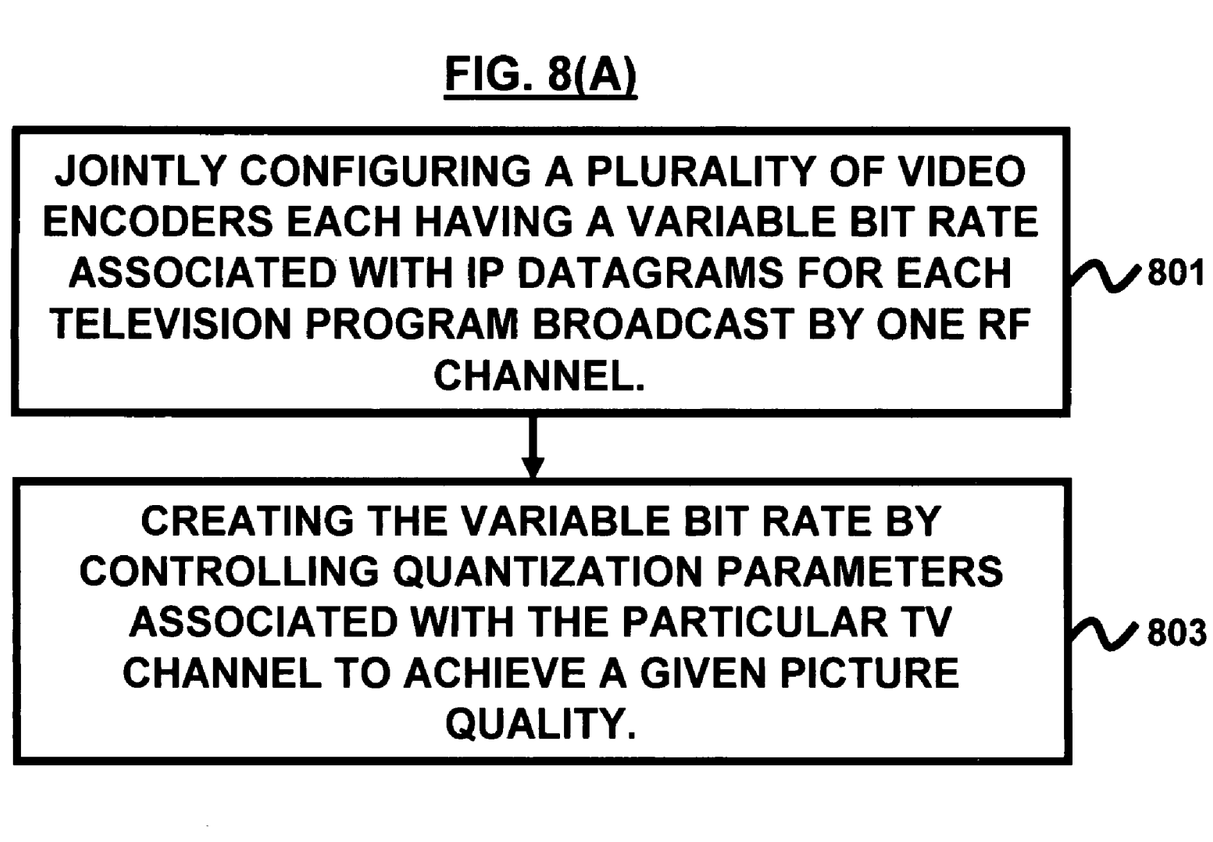
FIGS. 8(A) through 8(C) are flow diagrams illustrating a preferred method according to an embodiment herein.
Figure 8B:
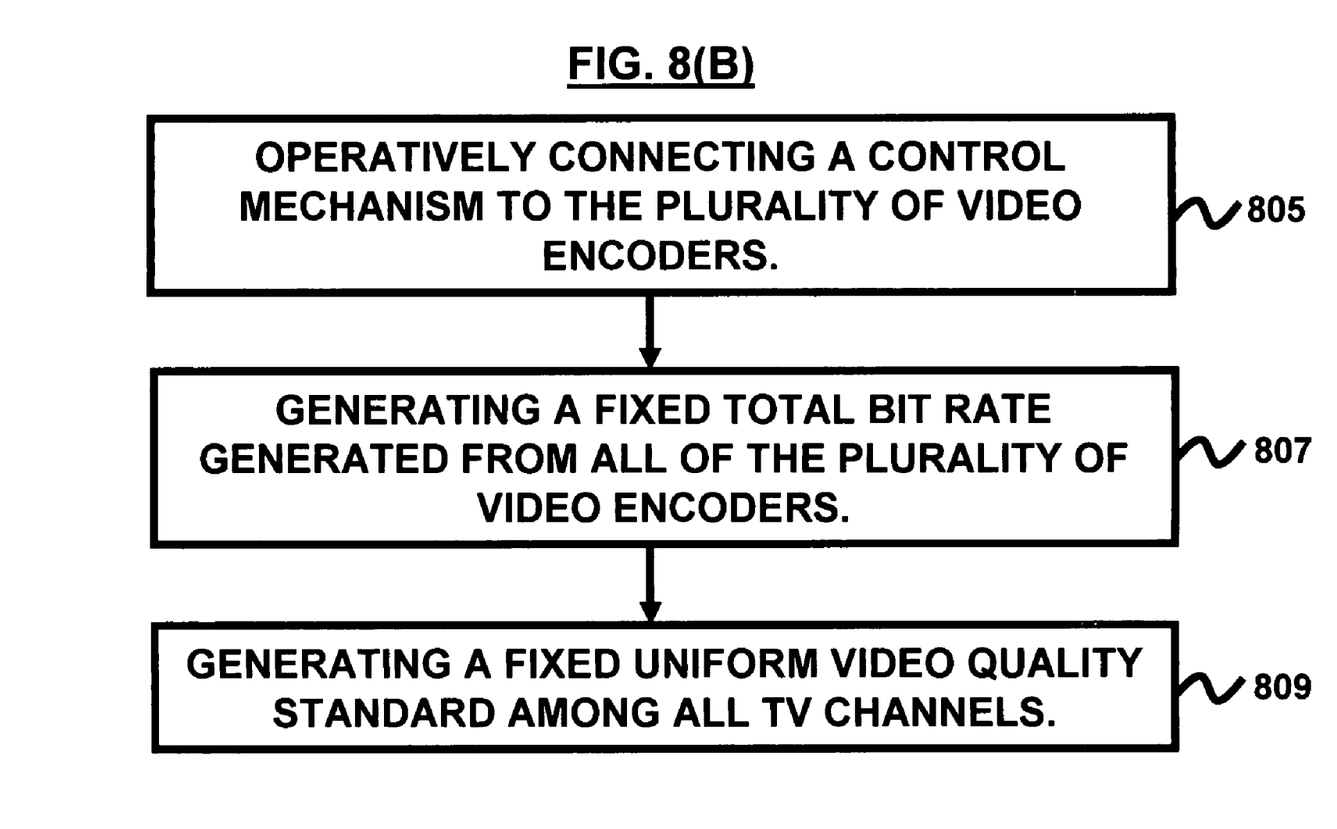
Figure 8C:
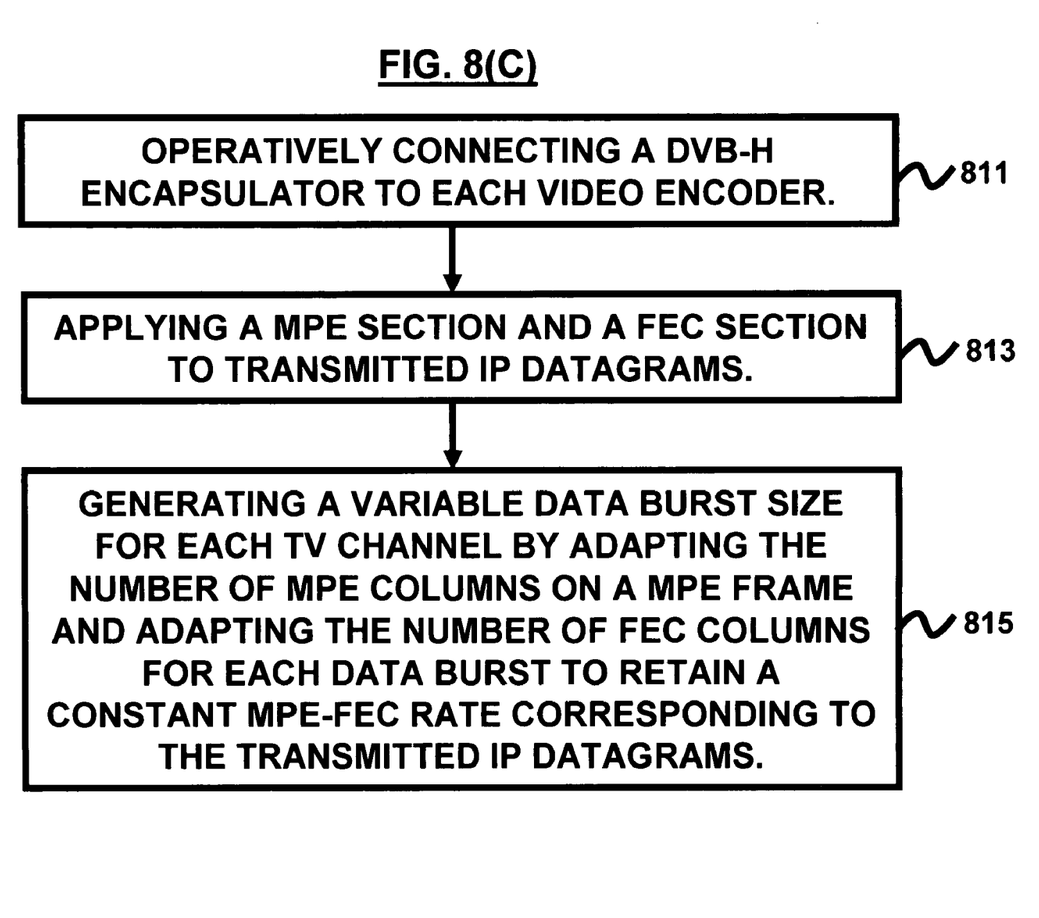

FIGS. 8(A) through 8(C), with reference to FIGS. 1 through 7, are flow diagrams illustrating a method for statistical multiplexing of video channels for DVB-H mobile TV applications, according to an embodiment herein, wherein the method comprises jointly configuring (801) a plurality of video encoders 405 each having a variable bit rate associated with IP datagrams for each television program broadcast by one RF channel. The method may further comprise creating (803) the variable bit rate by controlling quantization parameters associated with the particular TV channel to achieve a given picture quality. Additionally, the method may further comprise operatively connecting (805) a control mechanism 407 to the plurality of video encoders 405; generating (807) a fixed total bit rate generated from all of the plurality of video encoders 405; and generating (809) a fixed uniform video quality standard among all TV channels.

Also, the method may further comprise operatively connecting (811) a DVB-H encapsulator 415 to each video encoder 405; applying (813) a MPE section and a FEC section to transmitted IP datagrams; and generating (815) a variable data burst size for each TV channel by adapting the number of MPE columns on a MPE frame and adapting the number of FEC columns for each data burst to retain a constant MPE-FEC rate corresponding to the transmitted IP datagrams. Furthermore, the method may further comprise creating the variable bit rate by controlling quantization parameters associated with the particular TV channel to achieve a given picture quality. Moreover, the method may further comprise adapting a Delta-t parameter for each data burst independently to convey timing information to a receiver 425.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A Digital Video Broadcasting-Handheld (DVB-H) transmitter comprising a plurality of video encoders each having a variable bit rate associated with internet protocol (IP) datagrams for each television program broadcast by one radio frequency (RF) channel.

2. The transmitter of claim 1, wherein each video encoder creates said variable bit rate by controlling quantization parameters associated with said particular TV channel to achieve a given picture quality.

3. The transmitter of claim 1, further comprising a control mechanism operatively connected to said plurality of video encoders, wherein said control mechanism measures a fixed total bit rate generated from all of said plurality of video encoders and fixes a uniform video quality standard among all TV channels.

4. The transmitter of claim 1, further comprising a DVB-H encapsulator operatively connected to each video encoder, wherein said DVB-H encapsulator applies a Multi Protocol Encapsulation (MPE) section and a Forward Error Correction (FEC) section to transmitted IP datagrams.

5. The transmitter of claim 4, wherein said DVB-H encapsulator generates a variable data burst size for each TV channel by adapting the number of MPE columns on a MPE frame and adapting the number of FEC columns for each data burst to retain a constant MPE-FEC rate corresponding to said transmitted IP datagrams.

6. The transmitter of claim 1, wherein each video creates said variable bit rate by controlling quantization parameters associated with said particular TV channel to achieve a given picture quality.

7. The transmitter of claim 4, wherein said DVB-H encapsulator provides a Delta-t parameter for said each data burst independently to convey timing information to a receiver.

8. A Digital Video Broadcasting - Handheld (DVB-H) transmitter comprising:
 a plurality of video encoders operatively connected to one another, wherein each video encoder corresponds with a separate television (TV) channel, and wherein said each video encoder receives audio and video (AV) internet protocol (IP) datagrams and generates a variable encoder bit rate corresponding to an AV transmission signal for a particular TV channel;
 a control mechanism operatively connected to said plurality of video encoders, wherein said control mechanism measures a fixed total encoder bit rate generated from all of said plurality of video encoders and to fix a uniform video quality standard among all TV channels;
 a DVB-H encapsulator operatively connected to said plurality of video encoders, wherein said DVB-H encapsulator applies a Multi Protocol Encapsulation (MPE) section and a Forward Error Correction (FEC) section to transmitted IP datagrams, and wherein said DVB-H encapsulator generates a variable data burst size for each TV channel by adapting the number of MPE columns on a MPE frame and adapting the number of FEC columns for each data burst to retain a constant MPE-FEC rate corresponding to said transmitted IP datagrams; and
 a multiplexer operatively connected to said DVB-H encapsulator, wherein said multiplexer receives said transmitted IP datagrams and generate DVB-H transport stream (TS) data packets.

9. The transmitter of claim 8, wherein said each video encoder creates a variable encoder bit rate by controlling quantization parameters associated with said particular TV channel to achieve a given picture quality.

10. The transmitter of claim 8, wherein said DVB-H encapsulator provides a Delta-t parameter for said each data burst independently to convey timing information to a receiver.

11. A method for statistical multiplexing of video channels for Digital Video Broadcasting - Handheld (DVB-H) mobile television (TV) applications in a DVB-H transmitter, said method comprising jointly configuring a plurality of video encoders each having a variable bit rate associated with internet protocol (IP) datagrams for each television program broadcast by one radio frequency (RF) channel.

12. The method of claim 11, further comprising creating said variable bit rate by controlling quantization parameters associated with said particular TV channel to achieve a given picture quality.

13. The method of claim 11, further comprising:
 operatively connecting a control mechanism to said plurality of video encoders;
 generating a fixed total bit rate generated from all of said plurality of video encoders; and
 generating a fixed uniform video quality standard among all TV channels.

14. The method of claim 11, further comprising:
 operatively connecting a DVB-H encapsulator to each video encoder;
 applying a Multi Protocol Encapsulation (MPE) section and a Forward Error Correction (FEC) section to transmitted IP datagrams; and
 generating a variable data burst size for each TV channel by:
  adapting the number of MPE columns on a MPE frame; and
  adapting the number of FEC columns for each data burst to retain a constant MPE-FEC rate corresponding to said transmitted IP datagrams.

15. The method of claim 11, further comprising creating said variable bit rate by controlling quantization parameters associated with said particular TV channel to achieve a given picture quality.

16. The method of claim 11, further comprising adapting a Delta-t parameter for said each data burst independently to convey timing information to a receiver.

17. A program storage device readable by computer and comprising a program of instructions executable by said computer to perform a method for statistical multiplexing of video channels for Digital Video Broadcasting - Handheld (DVB-H) mobile television (TV) applications, said method comprising jointly configuring a plurality of video encoders each having a variable bit rate associated with internet protocol (IP) datagrams for each television program broadcast by one radio frequency (RF) channel.

18. The program storage device of claim 17, wherein said method further comprises creating said variable bit rate by controlling quantization parameters associated with said particular TV channel to achieve a given picture quality.

19. The program storage device of claim 17, wherein said method further comprises:
- operatively connecting a control mechanism to said plurality of video encoders;
- generating a fixed total bit rate generated from all of said plurality of video encoders; and
- generating a fixed uniform video quality standard among all TV channels.

20. The program storage device of claim 17, wherein said method further comprises:
- operatively connecting a DVB-H encapsulator to each video encoder;
- applying a Multi Protocol Encapsulation (MPE) section and a Forward Error Correction (FEC) section to transmitted IP datagrams; and
- generating a variable data burst size for each TV channel by:
  - adapting the number of MPE columns on a MPE frame; and
  - adapting the number of FEC columns for each data burst to retain a constant MPE-FEC rate corresponding to said transmitted IP datagrams.

21. The program storage device of claim 17, wherein said method further comprises creating said variable bit rate by controlling quantization parameters associated with said particular TV channel to achieve a given picture quality.

22. The program storage device of claim 17, wherein said method further comprises adapting a Delta-t parameter for said each data burst independently to convey timing information to a receiver.

* * * * *